United States Patent
Goerlitzer et al.

(10) Patent No.: US 7,138,485 B2
(45) Date of Patent: Nov. 21, 2006

(54) METHOD FOR REMOVING METAL IONS FROM POLYMERS OR POLYMER SOLUTIONS

(75) Inventors: Hans Goerlitzer, Seligenstadt (DE); Dorothea Staschik, Nidderau (DE)

(73) Assignee: Röhm GmbH & Co. KG, Darmstadt (DE)

( * ) Notice: Subject to any disclaimer, the term of this patent is extended or adjusted under 35 U.S.C. 154(b) by 5 days.

(21) Appl. No.: 10/515,060

(22) PCT Filed: Jun. 28, 2003

(86) PCT No.: PCT/EP03/06877

§ 371 (c)(1),
(2), (4) Date: Nov. 19, 2004

(87) PCT Pub. No.: WO2004/020483

PCT Pub. Date: Mar. 11, 2004

(65) Prior Publication Data

US 2005/0199549 A1    Sep. 15, 2005

(30) Foreign Application Priority Data

Aug. 30, 2002 (DE) .............................. 102 40 775

(51) Int. Cl.
*C08F 6/00* (2006.01)
(52) U.S. Cl. ...................... 528/482; 524/836; 524/856; 528/486; 528/496
(58) Field of Classification Search ................ 524/836, 524/856; 528/482, 486, 496
See application file for complete search history.

(56) References Cited

FOREIGN PATENT DOCUMENTS

| CN | 1 210 111 | 3/1999 |
|---|---|---|
| DE | 35 20 103 | 12/1986 |
| EP | 0 781 782 | 7/1997 |
| EP | 1 288 230 | 3/2003 |

*Primary Examiner*—Terressa Boykin
(74) *Attorney, Agent, or Firm*—Oblon, Spivak, McClelland, Maier & Neustadt, P.C.

(57) ABSTRACT

The invention relates to a simple, economical and reliable method for removing catalytic residues from polymer solutions. According to the inventive method, the copper content is reduced to a non-disturbing concentration level.

23 Claims, No Drawings

METHOD FOR REMOVING METAL IONS FROM POLYMERS OR POLYMER SOLUTIONS

FIELD OF THE INVENTION

The invention relates to a process for the removal of metal complexes, of metal ions, and of metals from polymers, from oligomers, or from polymer solutions, or from oligomer solutions. These have been prepared by means of ATRP (atom transfer radical polymerization). In the work-up, the catalyst, mostly a copper complex, or else downstream products is/are removed from the polymer. The present invention further relates to the polymer compositions obtainable via the inventive process, and also to their use.

PRIOR ART

Free-radical polymerization is an important commercial process for the production of a wide variety of polymers, such as polymethyl methacrylate (PMMA) and polystyrene (PS). A disadvantage here is that it is relatively difficult to control the structure of the polymers, the molecular weight, and the molecular weight distribution.

The process known as ATRP (=atom transfer radical polymerization) provides a solution to these problems. It is assumed that "living" free-radical polymerization is involved here, but no restriction is intended to result from the description of the mechanism. In these processes, a transition metal compound is reacted with a compound which has a transferable atomic group. The transferable atomic group here is transferred to the transition metal compound, thus oxidizing the metal. This reaction forms a free radical which undergoes an addition reaction with ethylenic groups. The transfer of the atomic group to the transition metal compound is reversible, however, and the atomic group is therefore transferred back to the growing polymer chain, the result being formation of a controlled polymerization system. Accordingly, it is possible to control the structure of the polymer, the molecular weight, and the molecular weight distribution.

Examples of descriptions of this mode of reaction are given by J.-S. Wang et al., *J. Am. Chem. Soc.* 1995, 117, 5614–5615, Matyjaszewski et al., *Macromolecules* 1995, 28, 7901–7910. The patent applications WO 96/30421, WO 97/47661, WO 97/18247, WO 98/20050, WO 98/40415 and WO 99/10387 moreover disclose variants of the ATRP process explained above.

The mechanism described above is not universally accepted. For example, WO 97/47661 says that the polymerization does not take place via a free-radical mechanism, but via insertion. However, this differentiation is unimportant for the present invention, because the mode of reaction disclosed in WO 97/47661 uses compounds that are also used in an ATRP process.

The selection of the monomers, of the transition metal catalysts, of the ligands, and of the initiators depends on the desired polymer solution. It is assumed that a high rate constant for the reaction between the transition metal-ligand complex and the transferable atomic group, together with a low concentration of free radicals in the equilibrium, are significant for a narrow molecular weight distribution. If the concentration of free radicals is too high, typical termination reactions occur, these being responsible for a broad molecular weight distribution. By way of example, the exchange rate depends on the transferable atomic group, on the transition metal, on the ligands, and on the anion of the transition metal compound.

The removal of the copper catalyst, generally highly colored, from the polymer or from the polymer solution continues to be a major obstacle to the industrial use of ATRP as a method for the production of polymers.

The strong color of the Cu compound(s) is not the only undesirable feature; others are the toxicity of the Cu compound(s), the corrosive action of the Cu compound(s), and the impairment of the weathering properties of the polymer via the content of Cu compound(s).

The methods known hitherto for the removal of the Cu compounds, for example filtration and/or chromatography over aluminum oxide, reprecipitation of the polymer from methanol, treatment with ion exchanger resins, are not always satisfactory.

Another disadvantage with the methods described is that they are expensive and therefore make industrial-scale use difficult.

Adsorption of Cu compounds on filters, on filter media, or on precipitation aids leads to relatively large amounts of heavy-metal-containing waste, which requires complicated disposal. It is therefore advisable to reduce these amounts.

WO 2001/0 403 177 (RohMax Additives GmbH) describes a method for the precipitation and filtration of the catalyst, which is insoluble in non-polar solvents, in this case mineral oil. The field of application of this method is naturally restricted.

Wang, Jackson, and Armes (Macromolecules 2000, 33, 255–257) describe the removal of catalyst residues by means of columns. Chromatography on $SiO_2$ columns. The size of the batches varies in the mmol range, and the column chromatography method can therefore only be used as a laboratory method.

EP 1 132 410 describes a process which removes the catalyst residues from a solution with a viscosity of less than 100 Pa·s in two steps. The first step consists in removing that portion of the complex which is insoluble in the polymer, and the second step consists in removing that portion of the complex which is soluble in the polymer. To this end, the polymer is dissolved again in a solvent, such as ethyl acetate. A transparent green solution is obtained and is treated with acidic ion exchanger. The material is stirred and then filtered. The solvent than has to be evaporated. The polymer comprises 4.6 ppm of Cu and 3.8 ppm of ligand residues. A disadvantage of this process is that there is an additional solution step at the end of the work-up. It is moreover capital-intensive, because ion exchangers are used.

Object

It was therefore an object to develop a method and devise a process which permit simple and inexpensive removal of the heavy-metal-containing catalysts and any downstream products used during the ATRP process. Heavy-metal-containing catalysts are not only the heavy metal in complex-bonded, ionic, or metallic form but also the organic ligand and the degradation and/or decomposition products of the organic ligand. The nature of these products has yet to be clarified.

Another object of the invention is to provide a process which depresses the content of copper (or of other heavy metal compounds used as catalysts) below a practically relevant value, using a minimum amount of adsorbent. The volume of catalyst wastes should be minimized in order to keep the possible disposal costs low, and, if possible, the catalyst wastes should be produced in a form which can be subjected to treatment. Desirable heavy metal contents in the polymer, for example for copper, are below 10 ppm, based on Cu (determined via AAS).

Another object of the invention was to provide a process which, via suitable chemical reactions, reduces the level of color of the polymers and, if possible, increases transparency, where appropriate at only slightly reduced, or indeed identical, copper content.

Very low heavy metal contents generally cease to have any optical effect, and mostly also have no adverse effect on the weathering properties and the transparency of the polymers obtained.

Heavy metal compounds in the polymer, in particular concentrations higher than 10 ppm of Cu compounds, lead to

- discoloration (via intrinsic color), adverse effect on weathering, undesirable toxicity (specifically food and drink applications)
- more marked discoloration during thermal forming processes, e.g. injection molding, melt pelletization, thermoforming, etc.
- impairment of mechanical properties of injection moldings Achievement of Object The achievement of the object consists in a process which follows the polymerization process and which encompasses two steps involving different methods.

- a first step of the process forms, from the copper-amine complex, which mostly has an intense green color, a less strongly colored, pale blue (or at least bluish) aquo complex, and transfers most of the resultant Cu complex from the organic, polymer-containing phase into an aqueous phase, and then
- a second step of the process absorbs the Cu-containing compounds together with the extractant on added materials.

Advantages of the Inventive Process

The extraction of Cu ions from the organic polymer phase via use of an aqueous phase can lead to phase separation problems. These phase separation problems extend from slow phase separation by way of poor phase separation with the associated poor removal of the heavy metal enriched within the aqueous phase, and also with losses of polymer, as far as complete absence of phase separation. The inventive process improves this situation.

The amount of the adsorbent needed to achieve the same reductions in heavy metal content is markedly smaller than when using the adsorbents without the inventive addition of aqueous solutions. With this, the amount of heavy-metal-containing wastes are also smaller.

The amount of residual copper in the polymer phase is markedly smaller than when using the adsorbents without the inventive addition of aqueous solutions, and the content of colored Cu compounds is smaller.

At the same residual copper content remaining in the polymer phase, the resultant level of color of the polymer is markedly smaller, and the transparency markedly greater, than when using the adsorbents without the inventive addition of aqueous solutions.

The content of amines and/or amine fragments in the polymer phase is likely to be smaller. These amines and/or amine fragments, produced during the decomposition and work-up of the Cu catalyst complex, likewise cause discoloration of the polymer phase.

When comparison is made with redissolution of the polymer in the solvent, the solvents and time needed for this are saved, as is the energy required for distillative removal.

Extractants which may be used are water or aqueous solutions. The latter may be acidified aqueous solutions. Examples of suitable materials for this purpose are mineral acids, such as sulfuric acid, or else various organic acids.

It is also possible to use aqueous solutions that have been rendered alkaline.

It is also possible to add, to the aqueous solution, other substances which may be suitable for reducing the solubility of a heavy metal in an organic phase.

The amounts used of aqueous extractant are, by way of example, from 0.05 to 20% by weight, based on the polymer or on the solution of the polymer, preferably from 0.1 to 10% by weight, based on the polymer or on the solution of the polymer, and very particularly preferably from 0.2 to 5% by weight.

Adsorbents which may be used are the filtration aids known per se, such as cellulose, cellulose powder, silica gel, kieselguhr (e.g. Celite® sold by Fluka), perlite, Tonsil (sold by Südchemie), molecular sieve (sold by: Merck KgaA, Darmstadt), vegetable charcoal, activated charcoal, and/or wood flour.

Celite® is a filter aid composed of various grain sizes of kieselguhr.

Tonsil® is a high-activity bleaching earth for adsorptive decolorization and purification of organic phases, such as oils, fats, or waxes.

Bleaching earths are various hydrous alumina silicates and/or hydrous magnesium silicates. The significant constituents present in these are montmorillonite or attapulgite. The terms used for these, depending on their source and use, are Fuller's earth, florida earth, bentonite, umber or bole, etc.

The amounts used of adsorbents are, by way of example, from 0.05 to 20% by weight, based on the polymer or on the solution of the polymer, preferably from 0.1 to 10% by weight, based on the polymer or on the solution of the polymer, and very particularly preferably from 0.2 to 5% by weight.

Conduct of the Process

Preparation of the Polymer Phase: Preparation of a PMMA-b-P$^t$BUMA Block Polymer 0.773 g of $Cu_2O$ are weighed into a Schlenck flask in a glove box, removed through the air-lock, and attached to a multi-path bridge for nitrogen and suction. 216.2 g of methyl methacrylate, 230 ml of toluene, and 1.873 g of pentamethyldiethylenetriamine are then added under a countercurrent of nitrogen. The mixture is freed from oxygen, using dry ice, and is degassed by applying suction. Next, the mixture is brought to reaction temperature (80° C.) in an oil bath. After 15 minutes, 1.054 g of ethyl 2-bromo-2-methylpropionate (diluted with a few ml of toluene) are injected, and the reaction is initiated. The mixture is stirred for 4 h at 80–90° C., and then a sample is taken and 27.03 g of tert-butyl methacrylate (diluted with 30 ml of toluene) are added. After a further 3 h of stirring at 80–90° C., the reaction mixture is cooled, and undissolved constituents are removed by way of a pressure filter (deep-bed filter, Seitz K-700). Depending on the success of the filtration process, the color of the solution obtained of the block copolymer in toluene, about 50% strength, is green of varying intensity.

A PMMA-b-P$^t$BUMA block copolymer selected by way of example had an average molar mass of 56 000 g/mol (determined via SEC). The measurement method used to determine the average molecular weight was PLG-M for the central molar mass range. The calibration method used was PS with linear extrapolation and polynomial fit 3 in the range MP 6 850 000–1320 g/mol. Tetrahydrofuran was used as eluent. The Cu content of the polymer varies in the range 200–600 ppm (determined via AAS).

Purification Step

An aliquot of the polymer solution is taken and treated with water or with the stated extractant. The material is stirred for about 5 min, whereupon a pale blue suspension/emulsion forms. The adsorbent is then added, and the material is again stirred for some time, and then filtered. Similar comparative experiments were carried out without water/extractant addition.

EXAMPLES 1–5

| Example | Aqueous phase | Amount[a] [% by wt.] | Adsorbent | Amount[a] [% by wt.] | Cu content in polymer[b] [ppm] |
|---|---|---|---|---|---|
| Initial solution | — | — | — | — | >>200 |
| 1 | $H_2O$ | 5 | 4 Å molecular sieve[c] | 2 | 15 |
| 2 | $H_2O$ | 1.6 | 4 Å molecular sieve[c] | 2 | 19 |
| 3 | $H_2O$ | 1.6 | 4 Å molecular sieve[c] | 3.3 | 2 |
| 4 | — | — | 4 Å molecular sieve[c] | 3 | 19 |
| 5 | — | — | 4 Å molecular sieve[c] | 4 | 9 |

[a]The percentage value is based on the amount of polymer solution to be purified.
[b]All of the volatile constituents were drawn off from the polymer solution in a vacuum drying cabinet, giving the Cu-containing polymer.
[c]Not activated/hydrous

EXAMPLES 6–9

| Example | Aqueous phase | Amount[a] [% by wt.] | Adsorbent | Amount[a] [% by wt.] | Cu content in polymer[b] [ppm] |
|---|---|---|---|---|---|
| Initial solution | — | — | — | — | >>550 |
| 6 | $H_2SO_4$, 2% strength | 1.6 | Celite | 1.6 | 190 |
| 7 | $H_2SO_4$, 2% strength | 0.8 | Celite | 0.8 | 235 |
| 8 | $H_2O$ | 1.6 | Celite | 1.6 | 395 |
| 9 | — | — | Celite | 1.6 | 535 |

[a]The percentage value is based on the amount of polymer solution to be purified.
[b]All of the volatile constituents were drawn off from the polymer solution in a vacuum drying cabinet, giving the Cu-containing polymer.

EXAMPLES 10–13

| Experiment | Aqueous phase | Amount[a] [% by wt.] | Adsorbent | Amount[a] [% by wt.] | Cu content in polymer[b] [ppm] |
|---|---|---|---|---|---|
| Initial solution | — | — | — | — | >>550 |
| 10 | $H_2SO_4$, 2% strength | 1.6 | Tonsil | 1.6 | 100 |
| 11 | $H_2SO_4$, 2% strength | 0.8 | Tonsil | 0.8 | 160 |
| 12 | $H_2O$ | 1.6 | Tonsil | 1.6 | 235 |
| 13 | — | — | Tonsil | 1.6 | 190 |

[a]The percentage value is based on the amount of polymer solution to be purified.
[b]All of the volatile constituents were drawn off from the polymer solution in a vacuum drying cabinet, giving the Cu-containing polymer.

EXAMPLES 14–15

| Experiment | Aqueous phase | Amount[a] [% by wt.] | Adsorbent | Amount[a] [% by wt.] | Cu content in polymer[b] [ppm] |
|---|---|---|---|---|---|
| Initial solution | — | — | — | — | >>550 |
| 14 | $H_2SO_4$, 2% strength | 1.6 | Celite/Tonsil (1:1) | 1.6 | 170 |
| 15 | $H_2SO_4$, 2% strength | 0.8 | Celite/Tonsil (1:1) | 0.8 | 235 |

[a]The percentage value is based on the amount of polymer solution to be purified.
[b]All of the volatile constituents were drawn off from the polymer solution in a vacuum drying cabinet, giving the Cu-containing polymer.

The resultant polymers have markedly better transparency and a lower level of color, even at the same copper content.

| Example | Aqueous phase/ adsorbent | Cu content in polymer [ppm] | T[a] [%] | L* | a* | b* |
|---|---|---|---|---|---|---|
| 13 | —/Tonsil | 190 | 75.82 | 89.78 | −2.96 | 7.11 |
| 6 | $H_2SO_4$, 2% strength/Celite | 190 | 82.04 | 92.59 | −3.49 | 3.35 |

[a]Transmittance weighted according to the sensitivity of the eye.

The test plaques for transparency measurement were produced with the aid of a Polystat 400 S platen press under the following conditions:

Stainless steel frame: 80×80×1 mm, cavity/mold: 24 mm diameter (circular), weight used: 2–3 g, preheating: 30 min at 100° C., pressing: 30 min at 160° C. and 80 bar, cooling: under pressure.

The measurement and evaluation of the samples complied with DIN 5033, Part 3.

What is claimed is:

1. A process for removing heavy-metal-containing catalysts or catalyst residues from an organic polymer phase selected from the group consisting of polymers, oligomers, solutions of polymers, and solutions of oligomers, comprising adding, in a first step of the process, from 0.05 to 20% by weight, based on the weight of the organic polymer phase, of an aqueous phase to the organic polymer phase and forming an emulsion or suspension thereof and, in a second step, adding an amount of from 0.05 to 20% by weight, based on the initial weight of the organic polymer phase, an adsorbent agent material to the emulsion or suspension and then filtering off the adsorbent agent material, whereby heavy-metal-containing catalysts or catalyst residues are removed.

2. The process as claimed in claim 1, wherein the aqueous phase is water and the water is added in an amount of from 0.1 to 10% by weight, and the amount of the adsorbent agent material used is from 0.1 to 10% by weight.

3. The process as claimed in claim 1, wherein the aqueous phase is water and the water is added in an amount of from 0.2 to 5% by weight, and the amount of the adsorbent agent material used is from 0.2 to 5% by weight.

4. The process as claimed in claim 1, wherein the adsorbent agent material is kieselguhr.

5. The process as claimed in claim 1, wherein the adsorbent agent material is a bleaching earth.

6. The process as claimed in claim 1, wherein the adsorbent agent material is a molecular sieve.

7. The process as claimed in claim 1, wherein the aqueous phase is acidified.

8. The process as claimed in claim 1, wherein the aqueous phase is brought to a pH below 4 with mineral acids or with organic acids.

9. The process as claimed in claim 1, wherein the aqueous phase is rendered alkaline.

10. The process as claimed in claim 1, wherein the aqueous phase comprises other substances which may be suitable for reducing the solubility of a heavy metal in an organic phase.

11. A plastics molding, capable of production from a polymer obtainable by a process of claim 1.

12. A method for the production of lacquer binders comprising adding a polymer or oligomer obtained by a process of claim 1 to a lacquer binder formulation.

13. A method for the production of hot-sealable compositions comprising adding a polymer or oligomer obtained by a process of claim 1 to a hot-sealable composition.

14. A method for the production of hot-sealable lacquers comprising adding a polymer or oligomer obtained by a process of claim 1 to a hot-sealable lacquer formulation.

15. A method for the production of compatibilizers comprising adding a polymer or oligomer obtained by a process of claim 1 to a compatibilizer formulation.

16. A method for the production of additives for plastics formulations comprising adding a polymer or oligomer obtained by a process of claim 1 to a plastic formulation.

17. A method for the production of additives for lacquer formulations comprising adding a polymer or oligomer obtained by a process of claim 1 to a lacquer formulation additive.

18. A lacquer binder comprising a polymer or oligomer obtained by a process of claim 1.

19. A hot-sealable composition comprising a polymer or oligomer obtained by a process of claim 1.

20. A hot-sealable lacquer comprising a polymer or oligomer obtained by a process of claim 1.

21. A compatibilizer comprising a polymer or oligomer obtained by a process of claim 1.

22. A plastic formulation comprising a polymer or oligomer obtained by a process of claim 1.

23. A lacquer formulation comprising a polymer or oligomer obtained by a process of claim 1.

* * * * *